United States Patent
Penzotti

(10) Patent No.: US 7,573,375 B2
(45) Date of Patent: Aug. 11, 2009

(54) ROLLOVER PREDICTION AND WARNING METHOD

(75) Inventor: Roger Paul Penzotti, Mount Vernon, WA (US)

(73) Assignee: PACCAR Inc, Bellevue, WA (US)

( * ) Notice: Subject to any disclaimer, the term of this patent is extended or adjusted under 35 U.S.C. 154(b) by 279 days.

(21) Appl. No.: 11/743,619

(22) Filed: May 2, 2007

(65) Prior Publication Data

US 2008/0272899 A1      Nov. 6, 2008

(51) Int. Cl.
*B60Q 1/00*        (2006.01)
(52) U.S. Cl. ............... 340/440; 340/441; 340/438; 340/439; 340/436
(58) Field of Classification Search ......... 340/440, 340/441, 436, 438, 439
See application file for complete search history.

(56) References Cited

U.S. PATENT DOCUMENTS

| | | | |
|---|---|---|---|
| 3,866,980 A * | 2/1975 | Eisele et al. ............. 303/122.1 |
| 5,617,086 A * | 4/1997 | Klashinsky et al. ......... 340/907 |
| 5,825,284 A | 10/1998 | Dunwoody | |
| 6,204,778 B1 * | 3/2001 | Bergan et al. ............... 340/936 |
| 6,225,894 B1 | 5/2001 | Kyrtsos | |
| 6,301,536 B1 | 10/2001 | Vaessen | |
| 6,324,447 B1 | 11/2001 | Schramm | |
| 6,338,012 B2 | 1/2002 | Brown | |
| 6,356,188 B1 | 3/2002 | Meyers | |
| 6,384,719 B1 | 5/2002 | Dieckmann | |
| 6,424,907 B1 | 7/2002 | Rieth | |
| 6,452,487 B1 | 9/2002 | Krupinski | |
| 6,498,976 B1 | 12/2002 | Ehlbeck | |
| 6,507,016 B1 | 1/2003 | Cooper | |
| 6,529,811 B2 | 3/2003 | Watson | |
| 6,593,849 B2 | 7/2003 | Chubb | |
| 6,629,575 B2 * | 10/2003 | Nikolov ..................... 180/282 |
| 6,631,317 B2 | 10/2003 | Lu | |
| 6,654,674 B2 | 11/2003 | Lu | |
| 6,684,140 B2 | 1/2004 | Lu | |
| 6,714,851 B2 | 3/2004 | Hrovat | |
| 6,718,248 B2 * | 4/2004 | Lu et al. ..................... 701/70 |
| 6,756,890 B1 | 6/2004 | Schramm | |
| 6,782,315 B2 | 8/2004 | Lu | |
| 6,834,218 B2 | 12/2004 | Meyers | |
| 6,856,868 B1 | 2/2005 | Le | |
| 6,904,350 B2 | 6/2005 | Lu | |
| 6,915,193 B2 | 7/2005 | Lu | |
| 6,961,648 B2 | 11/2005 | Salib | |
| 6,963,797 B2 | 11/2005 | Salib | |
| 7,003,389 B2 | 2/2006 | Lu | |
| 7,020,552 B2 | 3/2006 | Park | |
| 7,027,902 B2 | 4/2006 | Lu | |
| 7,027,903 B2 | 4/2006 | Meyers | |
| 7,057,503 B2 | 6/2006 | Watson | |
| 7,079,928 B2 | 7/2006 | Lu | |
| 7,085,639 B2 | 8/2006 | Lu | |

(Continued)

*Primary Examiner*—Daryl Pope
(74) *Attorney, Agent, or Firm*—Christensen O'Connor Johnson Kindness PLLC

(57) ABSTRACT

A system for determining a rollover property of a vehicle includes sensors capable of sensing lateral acceleration, a first left tire rotational speed, a first right tire rotational speed, and a mass property. The sensors output a lateral acceleration signal, a first left tire rotational speed signal, a first right tire rotational speed signal, and a mass property signal. A processing unit receives the signals and uses the received signals to determine a rollover property of the vehicle.

28 Claims, 4 Drawing Sheets

U.S. PATENT DOCUMENTS

| | | |
|---|---|---|
| 7,092,808 B2 | 8/2006 | Lu |
| 7,096,103 B2 | 8/2006 | Salib |
| 7,120,528 B2 | 10/2006 | Salib |
| 7,130,735 B2 | 10/2006 | Brown |
| 7,136,730 B2 | 11/2006 | Lu |
| 7,136,731 B2 | 11/2006 | Lu |
| 7,194,351 B2 | 3/2007 | Lu |
| 7,197,388 B2 | 3/2007 | Xu |
| 2002/0017415 A1* | 2/2002 | Campbell et al. ........... 180/271 |
| 2004/0030481 A1 | 2/2004 | Salib |
| 2005/0033486 A1 | 2/2005 | Schmitt |
| 2005/0060082 A1 | 3/2005 | Heuer |
| 2005/0182083 A1* | 8/2005 | Weinstein et al. ........... 514/286 |
| 2005/0273240 A1 | 12/2005 | Brown |
| 2005/0288842 A1 | 12/2005 | Brewer |
| 2006/0089771 A1 | 4/2006 | Messih |
| 2006/0129291 A1 | 6/2006 | Lu |
| 2006/0129298 A1 | 6/2006 | Takeda |
| 2006/0178799 A1 | 8/2006 | Hoying |
| 2007/0260385 A1* | 11/2007 | Tandy et al. ................... 701/70 |

* cited by examiner

ROLLOVER PREDICTION AND WARNING METHOD

BACKGROUND

A rollover accident is an extremely hazardous event for a vehicle operator. The danger of rollover accidents is illustrated by data from the Transportation Research Institute at the University of Michigan (UMTRI), which shows that although rollover occurs in less than 5% of accidents involving tractor-semitrailers, these accidents account for 58% of the fatal injuries suffered by truck drivers. Accordingly, in recent years there has been an increased interest in developing systems that can help avoid vehicle rollovers, especially with respect to heavy duty trucks.

Presently known systems for preventing vehicle rollover employ a variety of methods to predict incipient rollover conditions. One known system detects and warns of a rollover condition using sensors to measure the vertical forces acting on each of the vehicle's drive wheels. Another sensor measures the lateral acceleration of the vehicle. Based on these sensor measurements, the system determines when load is transferred laterally between the wheels of an axle. The system also determines the vehicle's center of gravity (CG). This information is used to calculate a lateral load transfer ratio (LTR), which corresponds to the actual roll moment acting on the vehicle. LTR is determined based on the difference between the loads acting on the left and right tires as compared to the sum of the loads acting on the tires. If the load on the left and right tires is equal, then LTR=0 and there is no danger of rollover. As one tire begins to lift off of the ground, as in a rollover condition, the load on the other tire increases until LTR=1. When LTR=1, the wheel on one side of the axle is completely lifted off the ground.

This presently known system also calculates the approximate height of the vehicle's CG, which is also an indicator of a potential rollover. A display provides the vehicle operator with an indication of the LTR and the estimated height of the vehicle's CG to warn the operator of potential rollover conditions. While this system has its advantages, it requires that load sensors be installed at each of the tires for which the forces acting thereon are to be measured. These load sensors would not otherwise be installed on the vehicle and, therefore, represent added cost and complexity for the vehicle.

Another known system detects a rollover event by comparing normal loads estimated for each tire with predetermined threshold values. The normal load on a tire is calculated based on the spring constant k and rolling radius r of the tire. The rolling radius R of each tire can be determined in a number of ways using different variables, including the velocity of the car at the car's CG, sideslip angle, steering angle, length of the wheel track, distance from the axle to the CG, and rotational speed of the tire. However, as most vehicles are not equipped to measure many of these variables, this system also requires that additional sensors be installed on the vehicle.

SUMMARY

The presently disclosed rollover prediction and warning method is effective for detecting an incipient rollover condition and warning the vehicle operator so that the operator can take corrective action. In one embodiment, the difference between the rotational speeds of the vehicle's left and right tires is sensed. If the vehicle is turning, part of the difference in rotational speeds is caused by the turn. This difference is calculated and subtracted from the overall difference between the rotational speeds of the tires. The result is approximately equal to the difference between the rotational speeds of the tires caused by load transfer.

As a vehicle travels through a turn, the outside tires travel a greater distance than the inside tires in a given amount of time. Therefore, the outside tires have a greater rotational speed than the inside tires. The difference between the rotational speeds of the inside and outside tires due to their different path radii can be determined from the speed V of the vehicle, the radius R of the turn, and the distance d between the inside and outside wheels. The speed V of the truck is determined by averaging the rotational speeds measured at the individual tires. The radius R of the turn is determined from the lateral acceleration and the velocity of the vehicle as it travels through a turn. The calculated value of R is used to determine the difference between the rotational speeds of the inside and outside tires caused by the turn.

As a roll moment acts on a vehicle, the load shifts from one side of the vehicle to the other side until the tires on one side carry all of the load, indicating an incipient rollover condition. As the load on a tire increases, the tire deflects, and its effective rolling radius decreases. As a result, the rotational speed of a tire increases as a greater percentage of the vehicle load is carried by that tire. Conversely, as the load applied to a tire decreases, the rolling radius of the tire increases, thereby reducing its rotational speed for a given vehicle velocity. The difference between the rotational speeds of the inside and outside tires is used to determine the differential deflection between the inside and outside tires caused by load transfer. Using a known spring constant K for the tires, the differential loading is determined from the differential deflections.

A total load on the wheels is determined by adding the vehicle's sprung weight, as determined by the air pressure of the vehicle's air spring suspension, to the vehicle's unsprung weight, which is fixed. A load transfer ratio (LTR) is calculated from the differential tire loading and the total tire loading. LTR is an indicator of the risk of rollover. Therefore, a warning signal is sent to the vehicle operator when LTR approaches a predetermined threshold, thus allowing the operator an opportunity to take corrective action.

Because methods described herein can use existing anti-lock braking system (ABS) sensors to sense the rotational speeds of individual wheels, the only additional sensor required is the lateral acceleration sensor.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
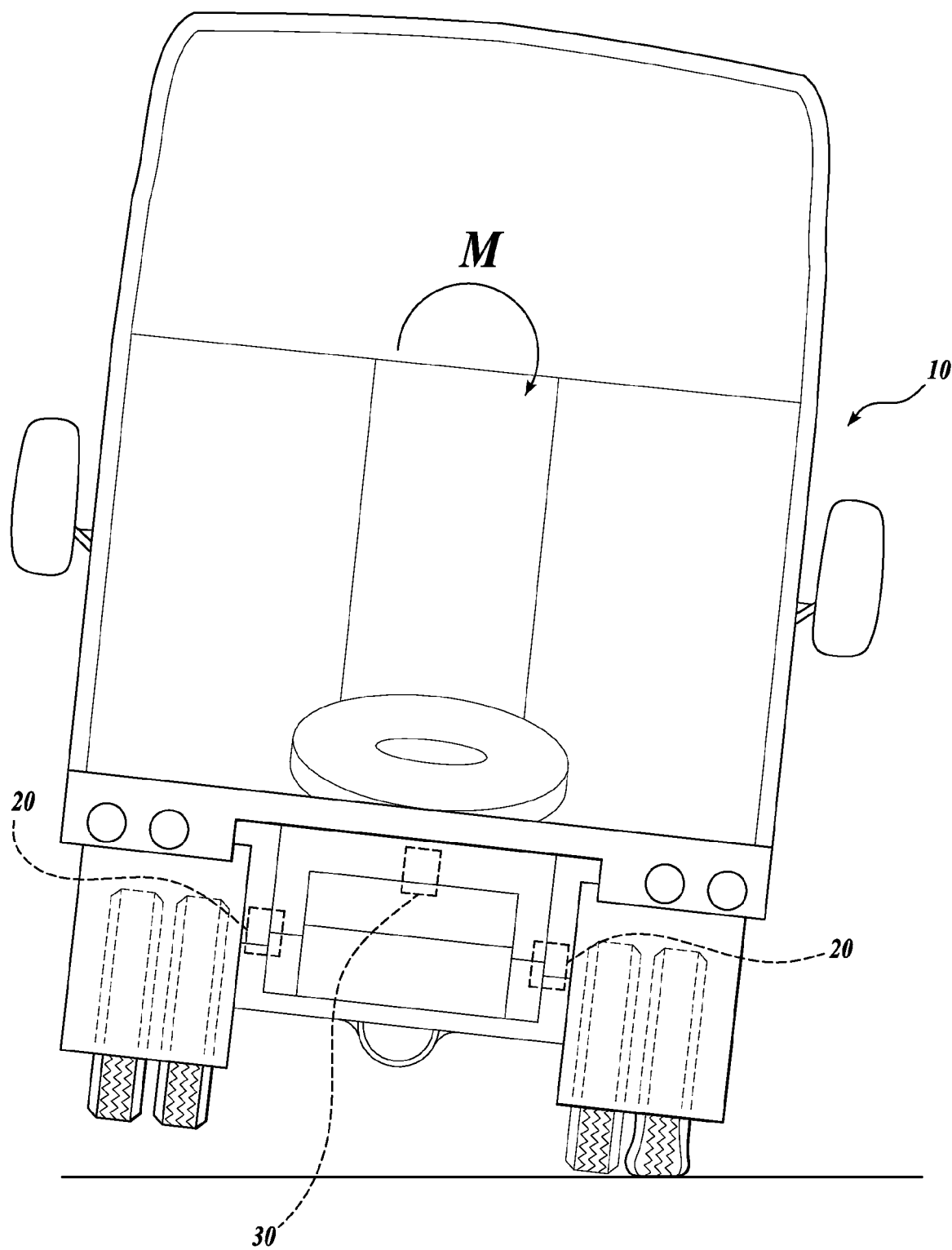
FIG. 1 is a rear view of a heavy duty vehicle undergoing a rollover event.

The disclosed subject matter is directed to a system and method for predicting and warning of a rollover condition in a vehicle without requiring determination of the vehicle's center of gravity (CG). As a vehicle begins to rollover, the load applied to the wheels on one side of the vehicle are transferred to the wheels of the other side of the vehicle until there is no load applied to the wheels on the first side of the vehicle. At this point, the unloaded wheels are free to lift off the ground, and the likelihood of a rollover is high. Unlike systems that require a measured or calculated CG, the present method uses the relative changes in loading between the left and right sides of the vehicle to determine a rollover parameter. In particular, a vehicle's lateral acceleration, individual tire speeds, and weight are used to determine the loads on the left and right side tires, $F_L$ and $F_R$, respectively. These loads are monitored to detect any lateral load transfer. Detected lateral load transfer is divided by the overall load to produce a load transfer ratio (LTR).

LTR correlates well to roll stability and can be based on loads measured for a single axle, or for any combination of multiple axles. One method of calculating LTR is as follows:

$$LTR = \frac{|\sum (F_L - F_R)|}{\sum (F_L + F_R)} \quad (1)$$

When the loads on each side of the vehicle are equal, then LTR=0, and there is no predicted rollover danger. At incipient rollover, the load on one side is completely transferred to the other side, and LTR=1. A roll margin is calculated from the LTR using the following formula:

Roll margin=1−LTR (2)

Roll margin is usually expressed as a percentage. Hence, if the vehicle is at incipient rollover, then LTR=1, and the roll margin is 0%.

Direct measurement of tire loads requires the use of ground-based scales. Several methods and devices have been used for indirectly estimating tire loads using sensors to variously measure suspension forces, suspension roll angles, axle bending strains, and the like. However, the sensors necessary to utilize these methods and devices are not standard equipment on most vehicles. As a result, currently known methods of predicting vehicle rollover using indirectly estimated tire load data require installing additional sensors at the wheels of the vehicle, which adds cost and complexity to the vehicle. To avoid the added cost and complexity, an alternate method for predicting a rollover condition described herein determines tire loads indirectly, based on differences between the rotational speeds of the vehicle's tires.

A tire acts like a spring, deflecting in response to applied loads. The amount that the tire deflects in response to an applied load depends on the stiffness of the tire and the magnitude of the load. The applied load acting on a tire over the normal range of operating loads is generally proportional to the deflection of the tire and can be calculated using deflection and the radial stiffness of the tire K. When the applied load increases, the tire deflection increases, and the rolling radius of the tire decreases. Consequently, for a vehicle traveling at a given velocity, increasing the load applied to a tire decreases the rolling radius of that tire, which in turn causes that tire to have a higher rotational speed. Conversely, if the load on a tire is decreased, the rolling radius increases and the tire has a lower rotational speed at a given vehicle velocity.

Alternately, the applied load can be determined using a database that relates tire deflection to an applied load for one or more given types of tire.

For a given vehicle velocity, the rotational speed of a tire is inversely proportional to the effective rolling radius $r_e$ of that tire. The effective rolling radius $r_e$ is the radius of a theoretical rigid tire having the same rotational speed as the actual tire for a given vehicle velocity. The effective rolling radius $r_e$ is not the same at the actual rolling radius $r_a$, which is the distance from the axis of the tire to the ground plane. Where $r_0$ is the radius of a tire with no load applied, the relationship between effective rolling radius $r_e$ and tire deflection $\delta$ can be approximated according to the following equation:

$$r_e = r_0 - \frac{\delta}{3} \quad (3)$$

Hence, the change in the rotational speed of a tire resulting from a change in radial deflection is about one third the amount that would be predicted from the change in the actual rolling radius $r_a$.

Assuming that the stiffness $K_L$ of a vehicle's left tire is identical to the stiffness $K_R$ of the corresponding right tire, the left and right tires will deflect by the same amount when the vehicle load is distributed equally between the left and right tires. As a result, when differences in tread wear and inflation between the left and right tires are discounted, the rolling radius of the left tire $r_L$ and the rolling radius of the right tire $r_R$ are equal. If $r_L = r_R$, then the rotational speed of the left tire $\omega_L$ is the same as the rotational speed of the right tire $\omega_R$ when the vehicle travels in a straight line.

Figure 3:
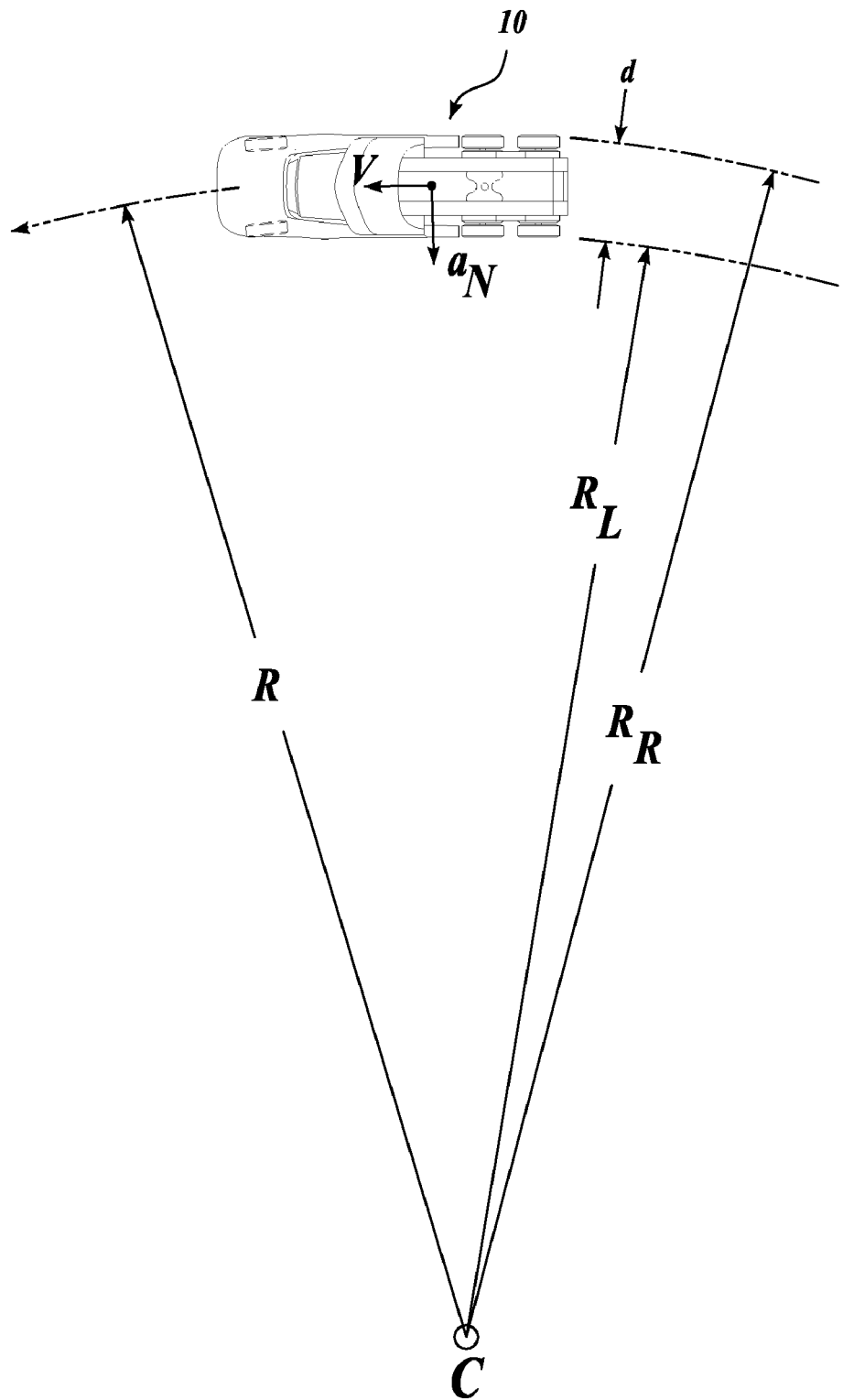
FIG. 3 is a plan view of the heavy duty vehicle of FIG. 1 turning along a curved path.

When the vehicle enters a turn, $\omega_L$ and $\omega_R$ are affected by two factors. The first factor is the difference between the paths traveled by the left and right tires. As shown in FIG. 3, at any given point during a turn, a vehicle travels with a velocity V along an arc with a turn radius R. As the vehicle turns to the left, a left tire travels along an arc with a radius $R_L$, which is less than R, while the corresponding right tire travels along an arc with a radius $R_R$, which is greater than R. Where d is a known distance between the left and right tires, $R_L$ and $R_R$ are related to R as follows:

$$R_L = R - \frac{d}{2} \quad (4)$$

$$R_R = R + \frac{d}{2} \quad (5)$$

Thus, when the vehicle is turning to the left, the right tires travel a greater distance in a given amount of time, and $\omega_R$ is increased. On the other hand, the left tires travel a shorter distance in a given amount of time, and $\omega_L$ is decreased. Conversely, a vehicle turning to the right will experience an opposite result, wherein $\omega_R$ is decreased, and $\omega_L$ is increased.

The second factor affecting $\omega_L$ and $\omega_R$ is the roll moment generated by the turn. As a vehicle travels through a turn, a centripetal force acts on the vehicle in the direction of the center of the turn. As a result, an apparent force, sometimes referred to as a centrifugal force, acts on the CG of the vehicle in a direction away from the center of the turn, thereby generating a roll moment M. As shown in FIG. 1, a vehicle turning to the left has a roll moment M that shifts the load from the left tires to the right tires. As the applied load on a right tire $F_R$ increases, the rolling radius of the right tire $r_R$ decreases, and $\omega_R$ increases. At the same time, the applied load on a left tire $F_L$ decreases so that the rolling radius of the left tire $r_L$ increases, and $\omega_L$ decreases. Conversely, for a vehicle turning to the right, $\omega_R$ is decreased, and $\omega_L$ is increased.

In order to determine the changes to $\omega_L$ and $\omega_R$ resulting from load transfer, the changes to $\omega_L$ and $\omega_R$ caused by turning are calculated and subtracted from the overall changes to $\omega_L$ and $\omega_R$. Changes to $\omega_L$ and $\omega_R$ caused by turning are calculated based on the value of turn radius R. Referring to FIG. 3, as a vehicle turns with a turn radius R and a velocity V, the vehicle accelerates towards the center of the turn C with an acceleration $a_N$. The radius R of the vehicle turn is related to the velocity V and the lateral acceleration $a_N$ as follows:

$$R = \frac{V^2}{a_N} \quad (6)$$

Figure 2:
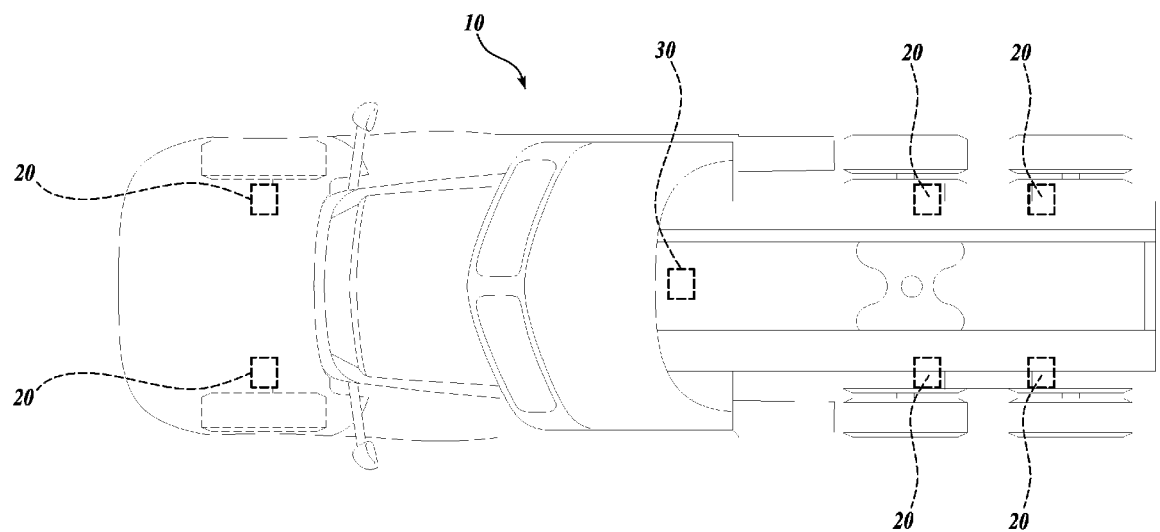
FIG. 2 is a plan view of the heavy duty vehicle of FIG. 1.

Referring to FIGS. 1 and 2, the lateral acceleration $a_N$ of the vehicle is sensed by a lateral acceleration sensor 30 installed on the vehicle. Vehicle velocity V is determined by averaging the speed at the vehicle tires. Most modern vehicles are equipped with anti-lock braking systems (ABS) that include sensors to continually monitor the speed of individual tires. Thus, the ABS sensors 20 provide an accurate and high sample rate speed signal for each tire without requiring additional sensors.

It should be appreciated that the radius R of the vehicle turn can be determined in a number of ways without departing from the scope of the disclosed subject matter. Alternate methods for determining R include sensors to monitor the vehicle steering system or to sense the orientation of the steerable wheels of the vehicle.

For a turning vehicle, the change in rotational speed of a left tire due to the turn ($\Delta\omega_{tL}$) and the change in rotational speed of a right tire due to the turn ($\Delta\omega_{tR}$) are related to the vehicle turn radius R as follows:

$$\Delta\omega_{tL} = \omega_{tL} - \omega = \omega \times \left(\frac{R_L}{R} - 1\right) \quad (7)$$

$$\Delta\omega_{tR} = \omega_{tR} - \omega = \omega \times \left(\frac{R_R}{R} - 1\right) \quad (8)$$

Subtracting equation (5) from equation (4) gives equation (6), which can be used to determine the difference between rotational speeds of the left tire and the right tire due to the turn $\Delta\omega_{t(L-R)}$ as follows:

$$\Delta\omega_{t(L-R)} = \omega \times \left(\frac{R_L - R_R}{R}\right) \quad (9)$$

Further, replacing the term "$R_L - R_R$" with the known distance d, yields the following:

$$\Delta\omega_{t(L-R)} = \omega \times \left(\frac{d}{R}\right) \quad (10)$$

The calculated difference between the rotational speeds of the left tire and the right tire due to the turn $\Delta\omega_{t(L-R)}$ is subtracted from the total difference between the rotational speeds of the left tire and the right tire $\Delta\omega_{(L-R)}$, which is determined from the ABS sensor data. The result is the difference between the rotational speeds of the left tire and the right tire due to load transfer $\Delta\omega_{l(L-R)}$. Having determined $\Delta\omega_{l(L-R)}$, the difference in the left and right rolling radii can be determined. The value of $\Delta\omega_{l(L-R)}$ and the known stiffness K of the tires are used to calculate the difference between the applied loads at the left and right tires $F_L - F_R$.

LTR calculation requires both the difference of the left and right tire loads $F_L - F_R$ and the sum of the left and right tire loads $F_L + F_R$. As discussed above, $F_L - F_R$ can be determined from changes in the rolling radius of the tires. The sum of the left and right tire loads is calculated by combining the vehicle's unsprung load with the vehicle's sprung load.

The mass of the vehicle's unsprung load is generally fixed and can be calculated or determined from manufacturer specifications. In contrast, the vehicle's sprung load varies with the payload and is detected by a load sensor. In one embodiment, the load sensor detects the pressure of the vehicle's air suspension. Air suspension is standard equipment for most commercial vehicles for on-highway use, and the pressure of an air spring provides an accurate measure of the sprung load supported by that air spring. Thus, a load sensor measures the air pressure of the air springs and calculates the total sprung load therefrom. By adding the unsprung load to the sprung load, the total ground load for the vehicle $\Sigma F_L + F_R$ is determined. Similarly, the ground load for an individual axle $F_L + F_R$ can be determined by adding the sprung load determined from the individual air springs supported by that axle to the unsprung load of the axle.

Figure 4:
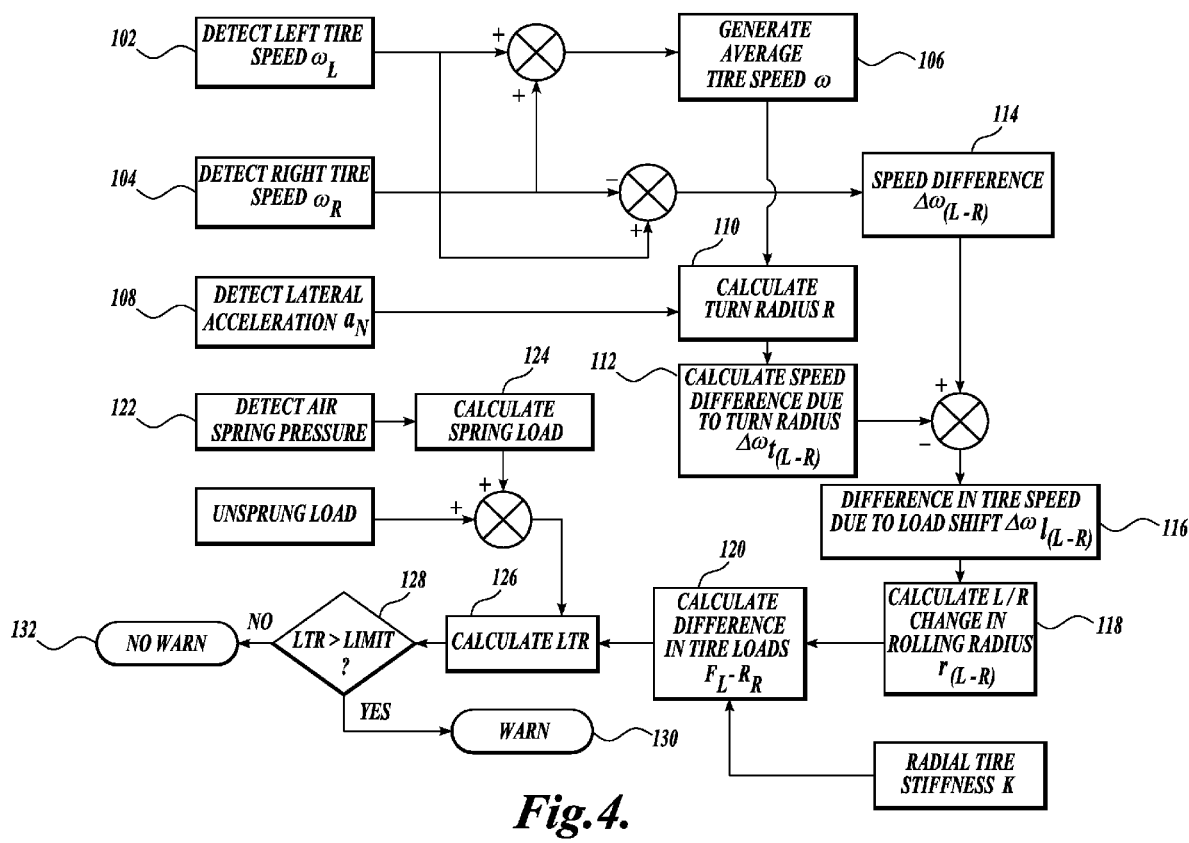
FIG. 4 is a flow diagram illustrating a rollover prediction and warning method in accordance with the present disclosure.

FIG. 4 shows a flow diagram illustrating the presently described embodiment of the rollover prediction and warning method. In steps 102 and 104, tire sensors sense the rotational speeds of the left tire $\omega_L$ and right tire $\omega_R$. The average rotational speed of the left and right tires $\omega$ is generated in step 106. Step 110 calculates the turn radius R from the average rotational speed $\omega$ and a lateral acceleration $a_N$ sensed in step 108. The difference between the rotational speeds of the left and right tires due to the turn $\Delta\omega_{t(L-R)}$ is calculated in step 112.

Still referring to FIG. 4, the value shown in step 114 is the difference between the rotational speeds of the left and right tires $\Delta\omega_{(L-R)}$, which is calculated by subtracting the rotational speed of the right wheel from the rotational speed of the left wheel. The difference between the rotational speeds of the left and right tires due to the load shift $\Delta\omega_{l(L-R)}$ is shown in step 116. This value is calculated by subtracting $\Delta\omega_{t(L-R)}$ from $\Delta\omega_{(L-R)}$. In step 118, the change in difference in the rolling radius between the left and right tires $r_{(L-R)}$ is calculated from $\Delta\omega_{l(L-R)}$. In step 120, $r_{(L-R)}$ and a known radial tire stiffness K are used to calculate the difference between the applied loads at the left and right tires $F_L - F_R$.

In step 124, the sprung load of the vehicle is calculated based on the air suspension's air spring pressure detected in step 122. The sprung load is added to the unsprung load to provide the total load on the left and right tires $F_L + F_R$.

LTR is calculated in step 126 by dividing the absolute value of ($F_L - F_R$) by $F_L + F_R$. In step 128, the LTR is compared to an LTR limit value. If the LTR is greater than the LTR limit value, then an incipient rollover condition is present, and a warning is sent to the vehicle operator. If the LTR is less than the LTR limit value, then no rollover condition exists, and no warning is sent.

It is noted that in practice, the nominal rolling radii of individual tires will not be identical due to a variety of factors, including tread wear, inflation pressure, tire type, etc. These differences can be detected by sampling the rotational speeds of the tires when the sensed lateral acceleration is approximately zero, i.e. when the vehicle is moving in a straight line. Because the vehicle is moving in a straight line, the difference between the rotational speeds of the tires is generally due to tire differences. By keeping a running average that incorporates multiple samplings, an accurate correction factor can be maintained.

While preferred embodiments of the claimed subject matter have been illustrated and described, it should be appreciated that various changes can be made therein without departing from the spirit and scope of the claimed subject matter.

The invention claimed is:

1. A system for determining a rollover property of a vehicle, comprising:
   (a) a lateral acceleration sensor capable of sensing a lateral acceleration of the vehicle and outputting a lateral acceleration signal;
   (b) a first speed sensor capable of sensing a first left tire rotational speed and outputting a first left tire speed signal;
   (c) a second speed sensor capable of sensing a first right tire rotational speed and outputting a first right tire speed signal;
   (d) a mass sensor for sensing a mass property and outputting a mass property signal; and
   (e) a processing unit for receiving the lateral acceleration signal, the first left tire speed signal, the first right tire speed signal, and the mass property signal, and for using the lateral acceleration signal, the first left tire speed signal, the first right tire speed signal, and the mass property signal to determine the rollover property of the vehicle.

2. The system of claim 1, wherein the processing unit determines a load transfer between the first left tire and the first right tire using the first left tire speed signal and the first right tire speed signal.

3. The system of claim 2, wherein the processing unit determines a load transfer ratio between the first left tire and the first right tire using the mass property signal and the load transfer between the first left tire and the first right tire.

4. The system of claim 1, wherein the processing unit determines a load differential between the first left tire and the first right tire using the first left tire speed signal and the first right tire speed signal.

5. The system of claim 4, wherein the processing unit determines a difference between a rolling radius of the first left tire and a rolling radius of the first right tire.

6. The system of claim 5, wherein the processing unit determines the load differential between the first left tire and the first right tire using a stiffness property of at least one of the first left tire and the first right tire, and the difference between the rolling radius of the first left tire and the rolling radius of the first right tire.

7. The system of claim 4, wherein the processing unit determines a portion of a difference between the first left tire speed signal and the first right tire speed signal that results from a vehicle turn radius.

8. The system of claim 7, wherein the processing unit determines the vehicle turn radius using to the lateral acceleration signal, the first left tire speed signal, and the first right tire speed signal.

9. The system of claim 7, wherein the processing unit determines a difference between the first left tire speed signal and the first right tire speed signal that results from the load differential.

10. The system of claim 1, wherein the first left tire has a first axis of rotation and the first right tire has a second axis of rotation, the first axis of rotation being coincident to the second axis of rotation.

11. The system of claim 1, further comprising:
    (a) a third speed sensor capable of sensing a second left tire rotational speed and outputting a second left tire speed signal;
    (b) a fourth speed sensor capable of sensing a second right tire rotational speed and outputting a second right tire speed signal; and
    wherein the processing unit further determines the rollover property from the second left tire speed signal and the second right tire speed signal.

12. The system of claim 11, wherein the second left tire has a third axis of rotation and the second right tire has a fourth axis of rotation, the third axis of rotation being coincident to the fourth axis of rotation.

13. The system of claim 1, further comprising:
    (a) a plurality of left tire speed sensors capable of sensing rotational speeds of a plurality of left tires and outputting a plurality of left tire speed signals;
    (b) a plurality of right tire speed sensors capable of sensing rotational speeds of a plurality of right tires and outputting a plurality of right tire speed signals; and
    wherein the processing unit further determines the rollover property from the plurality of left tire speed signals and the plurality of right tire speed signals.

14. A system for determining a rollover property of a vehicle, comprising:
    (a) a steering sensor capable of sensing a vehicle turn radius and outputting a steering signal;
    (b) a first speed sensor capable of sensing a first left tire rotational speed and outputting a first left tire speed signal;
    (c) a second speed sensor capable of sensing a first right tire rotational speed and outputting a first right tire speed signal;
    (d) a mass sensor capable of sensing a mass property and outputting a mass signal; and
    (e) a processor for receiving the steering signal, the first left tire speed signal, the first right tire speed signal, and the mass signal, and using the steering signal, the first left tire speed signal, the first right tire speed signal, and the mass signal to determine the rollover property of the vehicle.

15. The system of claim 14, wherein the processor determines a load transfer between the first left tire and the first right tire using the first left tire speed signal and the first right tire speed signal.

16. The system of claim 15, wherein the processor determines a load transfer ratio between the first left tire and the first right tire using the mass property signal and the load transfer between the first left tire and the first right tire.

17. The system of claim 14, wherein the processor determines a load differential between the first left tire and the first right tire using the first left tire speed signal and the first right tire speed signal.

18. The system of claim 17, wherein the processor determines a difference between a first rolling radius of the first left tire and a second rolling radius of the first right tire.

19. The system of claim 18, wherein the processor determines the load differential between the first left tire and the first right tire using a stiffness property of at least one of the first left tire and the first right tire, and the difference between the first rolling radius of first the left tire and the second rolling radius of the first right tire.

20. The system of claim 14, wherein the processor determines a portion of a difference between the first left tire speed signal and the first right tire speed signal that results from the vehicle turn radius.

21. The system of claim 14, wherein the processor determines a difference between the first left tire speed signal and the first right tire speed signal that results from the load differential.

22. The system of claim 14, further comprising:
   (a) a plurality of left tire speed sensors capable of sensing rotational speeds of a plurality of left tires and outputting a plurality of left tire speed signals;
   (b) a plurality of right tire speed sensors capable of sensing rotational speeds of a plurality of right tires and outputting a plurality of right tire speed signals; and
   wherein the processing unit further determines the rollover property from the plurality of left tire speed signals and the plurality of right tire speed signals.

23. A method for determining a rollover property of a vehicle, comprising:
   (a) detecting rotational wheel speed for a left wheel and a right wheel of the vehicle, said right wheel being opposite said left wheel;
   (b) determining a mass property;
   (c) determining a change in a load applied to said left wheel and said right wheel from changes in the rotational wheel speed of said left wheel and said right wheel;
   (d) calculating a load transfer from the mass property and the change in load applied to said left wheel and said right wheel;
   (e) calculating a load transfer ratio; and
   (f) predicting the status of a rollover condition based on a comparison of the calculated load transfer ratio to a threshold load transfer ratio.

24. The method of claim 23, wherein the step of determining a change in a load applied to said left wheel and said right wheel further comprises:
   (a) determining a vehicle turn radius;
   (b) calculating a portion of the changes in the rotational wheel speed of said left wheel and said right wheel resulting from the vehicle turn radius; and
   (c) subtracting the portion of the changes in the rotational wheel speed of said left wheel and said right wheel resulting from the vehicle turn radius from the changes in the rotational wheel speed of said left wheel and said right wheel.

25. The method of claim 24, wherein the step of determining a vehicle radius comprises:
   (a) determining a lateral acceleration of the vehicle;
   (b) determining a speed of the vehicle; and
   (c) calculating a vehicle turn radius from the lateral acceleration of the vehicle and the speed of the vehicle.

26. The method of claim 23, wherein the step of determining a change in a load applied to said left wheel and said right wheel comprises determining a difference between a rolling radius of said left tire and a rolling radius of said right tire.

27. The method of claim 26, wherein the step of determining a change in a load applied to said left wheel and said right wheel further comprises calculating the change in load applied to said left wheel and said right wheel from the difference between the rolling radius of said left tire and the rolling radius of said right tire and a stiffness property of at least one of said left tire and said right tire.

28. A method for determining a rollover property of a vehicle, comprising:
   (a) detecting rotational wheel speed for a plurality of left wheels and a plurality of right wheels of the vehicle;
   (b) determining a mass property;
   (c) determining a change in a load applied to said plurality of left wheels and said plurality of right wheels according to changes in the rotational wheel speed of said plurality of left wheels and said plurality of right wheels;
   (d) calculating a load transfer from the mass property and the change in load applied to said plurality of left wheels and said plurality of right wheels;
   (e) calculating a load transfer ratio; and
   (f) predicting the status of a rollover condition based on a comparison of the calculated load transfer ratio to a threshold load transfer ratio.

* * * * *

UNITED STATES PATENT AND TRADEMARK OFFICE
CERTIFICATE OF CORRECTION

| | | |
|---|---|---|
| PATENT NO. | : 7,573,375 B2 | |
| APPLICATION NO. | : 11/743619 | |
| DATED | : August 11, 2009 | |
| INVENTOR(S) | : R. P. Penzotti | |

It is certified that error appears in the above-identified patent and that said Letters Patent is hereby corrected as shown below:

| COLUMN | LINE | ERROR |
|---|---|---|
| 7 | 61 | after "using" delete "to" |
| 8 | 66 | "first the" should read --the first-- |

Signed and Sealed this

Seventeenth Day of July, 2012

David J. Kappos
*Director of the United States Patent and Trademark Office*